(12) United States Patent
Kawasato et al.

(10) Patent No.: US 8,101,143 B2
(45) Date of Patent: Jan. 24, 2012

(54) PROCESS FOR PRODUCING LITHIUM-CONTAINING COMPOSITE OXIDE FOR POSITIVE ELECTRODE FOR LITHIUM SECONDARY BATTERY

(75) Inventors: Takeshi Kawasato, Chigasaki (JP); Megumi Uchida, Chigasaki (JP); Toshiaki Abe, Chigasaki (JP); Naoshi Saito, Chigasaki (JP); Manabu Suhara, Chigasaki (JP)

(73) Assignee: Seimi Chemical Co., Ltd., Chigasaki-shi (JP)

( * ) Notice: Subject to any disclaimer, the term of this patent is extended or adjusted under 35 U.S.C. 154(b) by 586 days.

(21) Appl. No.: 11/529,301

(22) Filed: Sep. 29, 2006

(65) Prior Publication Data

US 2007/0026314 A1 Feb. 1, 2007

Related U.S. Application Data

(63) Continuation of application No. PCT/JP2005/006516, filed on Apr. 1, 2005.

(30) Foreign Application Priority Data

| Apr. 2, 2004 | (JP) | 2004-110392 |
| Apr. 14, 2004 | (JP) | 2004-119618 |
| Apr. 14, 2004 | (JP) | 2004-119620 |

(51) Int. Cl.
*H01M 4/58* (2010.01)
*H01M 4/50* (2010.01)
*H01M 4/52* (2010.01)
*C01D 15/00* (2006.01)

(52) U.S. Cl. ............... 423/179.5; 423/464; 423/465; 423/593.1; 423/594; 423/598; 423/599; 423/608; 423/625; 423/635; 429/223; 429/224; 429/231.1; 429/231.3; 429/231.95

(58) Field of Classification Search ............... 429/231.1, 429/231.3, 231.5, 231.6, 231.95, 218.1, 232; 423/593, 594, 598, 599, 600, 608, 625, 635
See application file for complete search history.

(56) References Cited

U.S. PATENT DOCUMENTS

| 5,742,070 | A  * | 4/1998  | Hayashi et al. ............ 252/182.1 |
| 6,117,410 | A  * | 9/2000  | Ogihara et al. ............ 423/599 |
| 6,241,959 | B1 * | 6/2001  | Cho et al. ............ 423/594.4 |
| 6,540,974 | B2 * | 4/2003  | Misra et al. ............ 423/600 |
| 6,569,569 | B1 * | 5/2003  | Kweon et al. ............ 429/231.1 |
| 6,749,965 | B1 * | 6/2004  | Kweon et al. ............ 429/231.1 |
| 7,192,672 | B2 * | 3/2007  | Horichi et al. ............ 429/128 |
| 7,481,991 | B2 * | 1/2009  | Kawasato et al. ............ 423/594.6 |
| 2001/0028874 | A1 * | 10/2001 | Cho et al. ............ 423/594 |
| 2002/0037456 | A1 * | 3/2002 | Hosoya ............ 429/231.3 |
| 2002/0102204 | A1 * | 8/2002 | Kohiro et al. ............ 423/594 |
| 2003/0140483 | A1 * | 7/2003 | Wakabayashi et al. ...... 29/623.1 |
| 2003/0211235 | A1 * | 11/2003 | Suh et al. ............ 427/126.1 |
| 2004/0057142 | A1 * | 3/2004 | Arfsten ............ 359/883 |
| 2006/0154146 | A1 | 7/2006 | Kawasato et al. |
| 2006/0210879 | A1 | 9/2006 | Kawasato et al. |

FOREIGN PATENT DOCUMENTS

| JP | 4-282560 | 10/1992 |
| JP | 8-290917 | 11/1996 |
| JP | 10-27611 | 1/1998 |
| JP | 10-81521 | 3/1998 |
| JP | 2001-76728 | 3/2001 |
| JP | 2001-283847 | 10/2001 |
| JP | 2003-7298 | 1/2003 |
| WO | WO 98/29915 | 7/1998 |

OTHER PUBLICATIONS

Machine translation of Shiozaki (JP2003-007298).*
Machine translation of Sunahara (JP2001-076728).*
Machine translation of Kazuhara et al (JP 2004-119221).*
Machine translation of Nozaki et al (JP 2000-260432).*
Fragnaud et al (Thin film cathodes for secondary lithium batteries, Journal of Power Sources, 54, 1995:362-366.*
U.S. Appl. No. 11/625,060, filed Jan. 19, 2007, Saito, et al.
U.S. Appl. No. 11/942,208, filed Nov. 19, 2007, Saito, et al.
U.S. Appl. No. 11/940,689, filed Nov. 15, 2007, Saito, et al.
U.S. Appl. No. 11/838,283, filed Aug. 14, 2007, Kawasato, et al.
U.S. Appl. No. 11/952,185, filed Dec. 7, 2007, Kawasato, et al.
U.S. Appl. No. 12/175,652, filed Jul. 18, 2008, Suhara, et al.
U.S. Appl. No. 12/606,224, filed Oct. 27, 2009, Uchida, et al.
U.S. Appl. No. 12/849,435, filed Aug. 3, 2010, Suhara, et al.

* cited by examiner

*Primary Examiner* — Melvin Mayes
*Assistant Examiner* — Jun Li
(74) *Attorney, Agent, or Firm* — Oblon, Spivak, McClelland, Maier & Neustadt, L.L.P.

(57) ABSTRACT

A process for producing a lithium-containing composite oxide for a positive electrode active material for use in a lithium secondary battery, the oxide having the formula $Li_p N_x M_m O_z F_a$ (wherein N is at least one element selected from the group consisting of Co, Mn and Ni, M is at least one element selected from the group consisting of Al, alkaline earth metal elements and transition metal elements other than N, $0.9 \leq p \leq 1.2$, $0.9 \leq x < 1.00$, $0 < m \leq 0.03$, $1.9 \leq z \leq 2.2$, $x+m=1$ and $0 \leq a \leq 0.02$), which comprises using as an M element source a solution comprising a complex containing the M element dissolved in an organic solvent.

11 Claims, No Drawings

PROCESS FOR PRODUCING LITHIUM-CONTAINING COMPOSITE OXIDE FOR POSITIVE ELECTRODE FOR LITHIUM SECONDARY BATTERY

BACKGROUND OF THE INVENTION

1. Field of the Invention

The present invention relates to a process for producing a lithium-containing composite oxide for a positive electrode for a lithium secondary battery, which has a large volume capacity density, high safety, an excellent durability for charge and discharge cycles and low temperature characteristics, a positive electrode for a lithium secondary battery containing the produced lithium-containing composite oxide, and a lithium secondary battery.

2. Discussion of Background

Recently, as the portability and cordless tendency of instruments have progressed, a demand for a non-aqueous electrolyte secondary battery such as a lithium secondary battery which is small in size and light in weight and has a high energy density, has been increasingly high. As a positive electrode active material for the non-aqueous electrolyte secondary battery, a composite oxide of lithium and a transition metal such as $LiCoO_2$, $LiNiO_2$, $LiNi_{0.8}Co_{0.2}O_2$, $LiMn_2O_4$ or $LiMnO_2$, has been known.

Among them, a lithium secondary battery using a lithium-containing composite oxide ($LiCoO_2$) as a positive electrode active material and using a lithium alloy or carbon such as graphite or carbon fiber as a negative electrode, can operate at a high voltage at a level of 4V, whereby it has been widely used as a battery having a high energy density.

However, in the case of the non-aqueous type secondary battery using $LiCoO_2$ as a positive electrode active material, further improvement of the capacity density per unit volume of a positive electrode layer and the safety, has been desired. On the other hand, there has been a problem of deterioration of the cyclic properties such as gradual reduction of the battery discharge capacity due to repetitive charge and discharge cycles, a problem of the weight capacity density or substantial reduction of the discharge capacity at a low temperature.

In order to solve part of these problems, it has been proposed in JP-A-6-243897 that the average particle size of $LiCoO_2$ as a positive electrode active material, be from 3 to 9 μm, the volume occupied by a group of particles having a particle size of from 3 to 15 μm, be at least 75% of the total volume, and the intensity ratio of the diffraction peaks at 2θ=about 19° and 2θ=45° as measured by means of X-ray diffraction using CuKα as a radiation source, be of a specific value, so that it becomes an active material excellent in coating properties, self-discharge properties and cyclic properties. Further, in the publication, it has been preferably proposed that $LiCoO_2$ does not substantially have such a particle size of smaller than 1 μm or larger than 25 μm. With such positive electrode active material, the coating properties and the cyclic properties have been improved, but, the safety, the volume capacity density and the weight capacity density, have not yet been fully satisfactory.

Further, in order to solve the problem related to the battery characteristics, JP-A-3-201368 proposes to replace 5 to 35% of Co atoms with W, Mn, Ta, Ti or Nb to improve the cyclic properties. Further, JP-A-10-312805 proposes to use hexagonal $LiCoO_2$ as a positive electrode active material to improve the cyclic properties, wherein the c axis length of the lattice constants is at most 14.051 Å, and the crystallite size of (110) direction of crystallites is from 45 to 100 nm.

Further, JP-A-10-72219 proposes that a lithium composite oxide of the formula $Li_xNi_{1-m}N_mO_2$ (wherein 0<x<1.1, 0≦m≦1), whereby the primary particles are plate-like or columnar, the ratio of (volume standard cumulative 95% size–volume standard cumulative 5% size)/(volume standard cumulative 5% size) is at most 3, and further, the average particle size is from 1 to 50 μm, has a high initial discharge capacity per weight and further is excellent in the charge and discharge cyclic durability.

Further, JP-A-2002-60225 proposes to lithiate a cobalt compound powder in the form of secondary particles having an average particle size of 0.5 to 30 μm formed by agglomeration of primary particles of cobalt hydroxide, cobalt oxyhydroxide or cobalt oxide with an average particle size of from 0.01 to 2 μm. However, also in this case, it is not possible to obtain a positive electrode material having a high volume capacity density, and further, the material is insufficient also with respect to the cyclic properties, the safety or the large current discharge properties.

As described above, in the prior art, with respect to a lithium secondary battery employing a lithium composite oxide as a positive electrode active material, it has not yet been possible to obtain one which sufficiently satisfies all of the volume capacity density, the safety, the coating uniformity, the cyclic properties and further the low temperature characteristics.

SUMMARY OF THE INVENTION

It is an object of the present invention to provide a process for producing a lithium-containing composite oxide for a positive electrode for a lithium secondary battery, which has a large volume capacity density, high safety, an excellent durability for charge and discharge cycles and further excellent characteristics in the low temperature, a positive electrode for a lithium secondary battery containing the produced lithium-containing composite oxide, and a lithium secondary battery.

The present inventors have conducted extensive studies and as a result, accomplished the present invention based on the following discoveries. That is, a lithium-containing composite oxide such as lithium cobalt oxide is basically excellent in the volume capacity density. However, its crystal structure repeatedly expands and contracts by the phase transition between the hexagonal system and the monoclinic system accompanying the insertion and extraction of lithium in the course of charge and discharge, whereby the crystal structure will be broken, and the cyclic properties will be deteriorated. It has been attempted to overcome this problem, as mentioned above, by replacing a part of cobalt in the lithium cobalt oxide with a specific additional element such as W, Mn, Ta, Ti or Nb to stabilize the crystal structure.

However, in the case of the above conventional method, an expected result has not necessarily been achieved. Namely, by conventional mixing of powders in a solid phase, it is difficult to uniformly mix the powders, and the resulting composite oxide does not have an uniform composition over the entire product, and it has a non-uniform composition which may be regarded as an impurity phase in part. For solving such a problem, a coprecipitation method has been studied in which all the components forming the composite oxide are uniformly precipitated from a liquid phase, but it has had problems such that it tends to be difficult to control the composition and the particle size.

The present inventors have found that the above object can be achieved by producing a lithium-containing composite oxide represented by the formula $Li_pN_xM_mO_zF_a$ (wherein N is at least one element selected from the group consisting of Co, Mn and Ni, M is at least one element selected from the group consisting of Al, alkaline earth metal elements and transition metal elements other than N, $0.9 \leq p \leq 1.2$, $0.9 \leq x<1.00$, $0<m \leq 0.03$, $1.9 \leq z \leq 2.2$, $x+m=1$ and $0 \leq a \leq 0.02$), by mixing a solution having a complex containing the M element dissolved in an organic solvent as an M element source with compound powders containing each of or a composite of an N element source and a lithium source and if necessary, a fluorine source, as other components, removing the organic solvent from the obtained mixture and firing the mixture.

Namely, the present invention is essentially directed to the following.

(1) A process for producing a lithium-containing composite oxide for a positive electrode for a lithium secondary battery, said lithium-containing composite oxide being represented by the formula $Li_pN_xM_mO_zF_a$ (wherein N is at least one element selected from the group consisting of Co, Mn and Ni, M is at least one element selected from the group consisting of Al, alkaline earth metal elements and transition metal elements other than N, $0.9 \leq p \leq 1.2$, $0.9 \leq x<1.00$, $0<m \leq 0.03$, $1.9 \leq z \leq 2.2$, $x+m=1$ and $0 \leq a \leq 0.02$), which comprises using as an M element source a solution comprising a complex containing the M element dissolved in an organic solvent.

(2) The process according to the above (1), wherein the complex containing the M element is a chelate complex of the M element, a glycol complex of a nitrate or chloride of the M element, or a β-diketone complex of a nitrate or chloride of the M element, and the organic solvent is a polar organic solvent.

(3) The process according to the above (1), wherein the complex containing the M element is a chelate complex of the M element, a complex containing a β-diketone group and an alkoxide group of the M element, and/or a complex of diethylene glycol and triethylene glycol of a nitrate of the M element.

(4) The process according to the above (1), wherein the M element is at least one member selected from the group consisting of Ti, Zr, Hf, Nb, Ta, Mg, Cu, Sn, Zn and Al.

(5) The process according to the above (1), wherein the M element is at least Al and Mg, the Al/Mg atomic ratio is from 1/5 to 5/1, and $0.002 \leq m \leq 0.025$.

(6) The process according to the above (1), wherein the M element is Mg and M2 (wherein M2 is at least one element selected from the group consisting of Ti, Zr, Ta and Nb), the M2/Mg atomic ratio is from 1/40 to 2/1, and $0.002 \leq m \leq 0.025$.

(7) The process according to the above (1), wherein the solution having a complex containing the M element dissolved in an organic solvent and an N source compound powder, and if necessary, a fluorine source compound powder are mixed, the organic solvent is removed from the obtained mixture, the mixture is mixed with a lithium source compound powder and if necessary, a fluorine source compound powder, and the resulting mixture is fired at from 800 to 1,050° C. in an oxygen-containing atmosphere.

(8) The process according to the above (1), wherein the solution having a complex containing the M element dissolved in an organic solvent, an N source compound powder and a lithium source compound powder, and if necessary, a fluorine source compound powder are mixed, the organic solvent is removed from the obtained mixture, and the mixture is fired at from 800 to 1,050° C. in an oxygen-containing atmosphere.

(9) The process according to the above (1), wherein a lithium source compound powder and an N source compound powder, and if necessary, a fluorine source compound powder are mixed and fired, the resulting lithium-containing composite oxide powder is mixed with the solution having a complex containing the M element dissolved in an organic solvent, the organic solvent is removed from the obtained mixture, and the mixture is fired in an oxygen-containing atmosphere at from 300 to 1,500° C.

(10) The process according to the above (1), wherein the integral breadth of the diffraction peak of (110) plane at $2\theta=66$ to 67° of the lithium-containing composite oxide is from 0.08 to 0.14 as measured by means of X-ray diffraction in which CuKα is used as a radiation source, the surface area is from 0.2 to 0.6 m$^2$/g, and the heat generation starting temperature is at least 160° C.

(11) The process according to the above (1), wherein the lithium-containing composite oxide has a press density of from 3.15 to 3.60 g/cm$^3$.

(12) The process according to the above (1), wherein the remaining alkali amount contained in the lithium-containing composite oxide is at most 0.03 wt %.

(13) A positive electrode for a lithium secondary battery containing a lithium-containing composite oxide produced by the process as defined in the above (1).

(14) A lithium secondary battery using the positive electrode as defined in the above (13).

According to the present invention, not only a lithium-containing composite oxide having excellent characteristics as a composite oxide for a positive electrode for a lithium secondary battery, such as a large volume capacity density, high safety, excellent charge and discharge cyclic durability and excellent low temperature characteristics, can be obtained, but also a process for producing a lithium-containing composite oxide with high productivity, in which process excellent intermediate storage stability is achieved, and further, a positive electrode for a lithium secondary battery containing the produced lithium-containing composite oxide and a lithium secondary battery are provided.

The reason why the above excellent effects can be achieved by the present invention is not necessarily made clear but is estimated as follows. Namely, in the case of addition of the M element in a conventional solid phase method, since the addition amount of the M element is very small, its uniform addition to an N element material or a positive electrode material has been difficult, and desired effects of addition of the M element have hardly been achieved. However, it is estimated that according to the process of the present invention, the M element in a solution state is added to the N element material or the positive electrode material, and thus the M element can be uniformly dispersed even in the pores of the positive electrode active material, whereby effects of improving the battery performance will be achieved by addition of the desired M element. Further, since the M element is added to the N element compound or added to the positive electrode material, control of the composition or the particle size of the positive electrode active material is easy as compared with a conventional coprecipitation method. Thus, the process of the present invention is industrially advantageous.

DETAILED DESCRIPTION OF THE PREFERRED EMBODIMENTS

The lithium-containing composite oxide for a positive electrode for a lithium secondary battery to be produced by the present invention is represented by the formula $Li_pN_xM_mO_zF_a$. In the formula, p, x, m, z and a are as defined above. Particularly, p, x, m, z and a are preferably as follows. $0.9 \leq p \leq 1.1$, particularly preferably $0.97 \leq p \leq 1.03$, $0.975 \leq x<1.00$, $0.002 \leq m \leq 0.025$ and $1.9 \leq z \leq 2.1$, particularly preferably $1.95 \leq z \leq 2.05$, $x+m=1$ and $0.001 \leq a \leq 0.01$. Here, when a is larger than 0, it is a composite oxide having some of its oxygen atoms substituted by fluorine atoms. In such a case, the safety of the positive electrode active material to be obtained will be improved. In the present invention, the total number of cation atoms is equal to the total number of anion atoms. That is, it is preferred that the total of p, x and m is equal to the total of z and a.

N is at least one element selected from the group consisting of Co, Mn and Ni, and it is preferably Co, Ni, Co and Ni, Mn and Ni or Co, Ni and Mn. Further, M is at least one element selected from the group consisting of Al, alkaline earth metals and transition metal elements other than N. In the present invention, this M element will sometimes be referred to as an additional element. The above transition metal elements represent transition metals of Group 4, Group 5, Group 6, Group 7, Group 8, Group 9, Group 10 and Group 11 of the Periodic Table. Among them, M is preferably at least one element selected from the group consisting of Ti, Zr, Hf, Nb, Ta, Mg, Cu, Sn, Zn and Al. Particularly, from the viewpoint of the capacity retention properties, the safety, the cyclic durability, etc., preferred is Ti, Zr, Hf, Mg or Al.

In the present invention, it is particularly preferred that M is Al and Mg, the Al/Mg atomic ratio is preferably from 1/5 to 5/1, more preferably from 1/3 to 3/1, particularly preferably from 2/3 to 3/2, and preferably $0.002 \leq m \leq 0.025$, more preferably $0.005 \leq m \leq 0.025$, particularly preferably $0.01 \leq m \leq 0.02$, whereby the battery performance i.e. the initial weight capacity density, the safety and the charge and discharge cyclic stability will be well balanced. Further, in the present invention, it is particularly preferred that M is Mg and M2 (wherein M2 is at least one element selected from the group consisting of Ti, Zr, Ta and Nb), the M2/Mg atomic ratio is preferably from 1/40 to 2/1, particularly preferably from 1/30 to 1/5, and preferably $0.002 \leq m \leq 0.025$, more preferably $0.005 \leq m \leq 0.025$, particularly preferably $0.01 \leq m \leq 0.02$, whereby the battery performance i.e. the initial weight capacity density, the safety and the charge and discharge cyclic stability will be well balanced.

In the present invention, in a case where the above F element is contained, the F element is preferably present on the surface of the lithium-containing composite oxide particles. By the presence of the element on the surface, important battery characteristics such as the safety and the charge and discharge cyclic properties can be improved by addition of a small amount without decreasing the battery performance. The presence of the element on the surface can be judged by carrying out a spectroscopic analysis such as an XPS analysis with respect to the positive electrode particles.

In the process for producing a lithium-containing composite oxide of the present invention, the M element as an additional element is used in the form of a solution having a complex containing the M element dissolved in an organic solvent. This term represents a solution having a complex compound of the M element dissolved in an organic solvent, a solution in which the M element forms a complex with an organic solvent and is dissolved, although the M element does not form a complex before dissolved in the organic solvent, or the like. In the former case, preferred examples of the complex compound of the M element include an M element chelate complex, a glycol complex of a nitrate of the M element or a chloride of the M element, and a β-diketone complex of a nitrate of the M element or a chloride of the M element. A chelating agent which forms an M element chelate complex is preferably a β-diketone compound or a glycol compound. The chelating agent is more preferably β-diketone, since a metal compound having both alkoxide group and β-diketone group will have high solubility in a solvent. The glycol complex of a nitrate of the M element or a chloride of the M element is preferably a mixture of two or more glycols, preferably diethylene glycol and triethylene glycol.

The organic solvent to be used for preparation of the solution having a complex containing the M element dissolved in an organic solvent, is preferably a polar organic solvent. The polar organic solvent is suitably one having a boiling point of preferably from 60 to 200° C., particularly preferably from 80 to 150° C. Specifically, it may, for example, be preferably an alcohol such as ethanol or 2-propanol, a glycol such as hexylene glycol or an aromatic hydrocarbon such as xylene. The polar organic solvent may contain a non-polar solvent such as hexane in an amount of usually at most 30 wt %. The concentration of the complex containing the M element in the organic solvent is preferably high so as to remove the organic solvent in the subsequent step, for example, preferably from 3 to 15 wt %, particularly preferably from 5 to 10 wt % as calculated as a metal.

In the present invention, the solution having a complex containing the M element dissolved in an organic solvent is then mixed preferably in the following manner (1), (2) or (3). (1) An N source compound powder and if necessary, a fluorine source compound powder, are mixed with the solution having a complex containing the M element dissolved in an organic solvent.
(2) An N source compound powder and a lithium source compound powder, and if necessary, a fluorine source compound powder, are mixed with the solution having a complex containing the M element dissolved in an organic solvent.
(3) An N source compound powder and a lithium source compound powder, and if necessary, a fluorine source compound powder, are mixed and fired in an oxygen-containing atmosphere preferably at from 800 to 1,050° C. (particularly preferably from 900 to 1,000° C.) for from 5 to 20 hours, followed by crushing and classification, and the resulting lithium-containing composite oxide powder and the solution having a complex containing the M element in an organic solvent are mixed.

The mixture ratio of each element is selected to achieve the desired ratio of each element within a range of the above $Li_pN_xM_mO_zF_a$ as the formula of the positive electrode active material to be finally produced. Further, the particle size of the N source compound powder and the fluorine source compound powder to be used if necessary is not particularly limited, and is preferably from 0.1 to 20 μm, particularly preferably from 0.5 to 15 μm to achieve favorable mixing.

As the N element compound to be used in the present invention, in a case where N is cobalt, cobalt carbonate, cobalt hydroxide, cobalt oxyhydroxide or cobalt oxide is preferably used. Particularly preferred is cobalt hydroxide or cobalt oxyhydroxide, with which the performance is likely to be achieved. Further, in a case where N is nickel, nickel hydroxide or nickel carbonate is preferably used. Further, in a case where N is manganese, manganese carbonate is preferably used.

In a case where the N element is compound containing at least two elements, the at least two elements are preferably uniformly dispersed at the atomic level by coprecipitation. A coprecipitated compound is preferably a coprecipitated hydroxide, a coprecipitated oxyhydroxide, a coprecipitated oxide, a coprecipitated carbonate or the like. In a case where the N element is a compound containing nickel and cobalt, the nickel/cobalt atomic ratio is preferably 90:10 to 70:30. Further, part of cobalt may be replaced with aluminum or manganese. In a case where the N element is a compound containing nickel, cobalt and manganese, the nickel/cobalt/manganese atomic ratio is preferably (10 to 50):(7 to 40):(20 to 70).

Further, in a case where N is a compound containing nickel and cobalt, preferred example is $Ni_{0.8}Co_{0.2}OOH$ or $Ni_{0.8}Co_{0.2}(OH)_2$, in a case where N is a compound containing nickel and manganese, preferred example is $Ni_{0.5}Mn_{0.5}OOH$, and in a case where N is a compound containing nickel, cobalt and manganese, preferred example is $Ni_{0.4}Co_{0.2}Mn_{0.4}(OH)_2$ or $Ni_{1/3}Co_{1/3}Mn_{1/3}OOH$.

As a method of obtaining a mixture with the solution of a complex containing the M element according to the above manner (1), a suitable mixing means can be selected, and preferred is, for example, (A) a method of dispersing the N element source compound powder and if necessary, the fluorine source compound powder in the solution of a complex containing the M element, followed by stirring, or (B) a method of spraying the solution of a complex containing the M element over the N source compound powder and the fluorine source compound powder mixed if necessary, by means of a spray.

Further, the mixing with the solution of a complex containing the M element in the above manner (1) to (3), is carried out preferably sufficiently uniformly by using e.g. an axial mixer. The solid content concentration in the mixture is preferably as high as possible so long as uniform mixing is achieved, but usually the solid/liquid ratio is suitably from 50/50 to 90/10, particularly preferably from 60/40 to 80/20.

Then, from the mixture obtained by an appropriate mixing means, the organic solvent is removed. The organic solvent is removed by drying preferably at from 50 to 200° C., particularly preferably at from 80 to 120° C. usually for from 1 to 10 hours. Since the organic solvent in the mixture is burned in the subsequent firing step, it is not necessarily completely removed in this step, but it is preferably removed as far as possible, since there is a risk of reduction of the material or the positive electrode material.

The mixture obtained in the above manner (2) or (3), from which the organic solvent was removed, is fired by a method mentioned hereinafter. On the other hand, the mixture obtained by the above manner (1), from which the organic solvent was removed, is preferably crushed to a powder having an appropriate size and mixed with a lithium source compound powder, and the mixture is fired by a means mentioned hereinafter. In this mixing also, mixing is carried out preferably sufficiently uniformly by means of a stirring machine such as an axial mixer or a drum mixer.

The lithium source compound to be used is preferably lithium carbonate or lithium hydroxide in any of the manners (1), (2) and (3). Lithium carbonate which is available at a low cost is particularly preferred. Similarly, as the fluorine source, a metal fluoride, LiF, $MgF_2$ or the like is selected. The particle size of the lithium source compound powder is not particularly limited but is preferably from 0.1 to 20 μm, particularly preferably from 0.5 to 15 μm so as to achieve favorable mixing.

Firing of the mixture obtained in the above manner (1) or (2) is carried out in an oxygen-containing atmosphere preferably at from 800 to 1,050° C. usually for from 5 to 20 hours. If the firing temperature is lower than 800° C., lithiation tends to be insufficient, and on the contrary, if it exceeds 1,050° C., the charge and discharge cyclic durability or the initial capacity tends to decrease. Particularly, the firing temperature is suitably from 900 to 1,000° C. The obtained fired product is cooled and then crushed and classified to produce lithium-containing composite oxide particles.

In the above manner (3), a mixture containing an N source compound powder and a lithium source powder and if necessary, a fluorine source compound powder, is obtained in the same manner as in the above-described mixing method. Further, the mixture is fired in the same manner as in the above-described firing method. The mixture obtained in the above manner (3) i.e. a mixture of a lithium-containing composite oxide powder containing an M element-containing complex, is fired in an oxygen-containing atmosphere at from 300 to 1,050° C. If the firing temperature is lower than 300° C., decomposition of organic substances will be insufficient, such being unfavorable. Further, if it exceeds 1,050° C., the charge and discharge cyclic durability or the initial capacity tends to decrease. Particularly, the firing temperature is suitably from 400 to 900° C. The obtained fired product is cooled and then crushed and classified to produce lithium-containing composite oxide particles.

With respect to the lithium-containing composite oxide of the present invention thus produced, the average particles size D50 is preferably from 8 to 18 μm, particularly preferably from 10 to 16 μm, the specific surface area is preferably from 0.2 to 0.6 $m^2$/g, particularly preferably from 0.3 to 0.5 $m^2$/g, the half value width of the diffraction peak of (110) plane at $2\theta=66.5\pm1°$ as measured by means of X-ray diffraction in which $CuK\alpha$ is used as a radiation source, is preferably from 0.08 to 0.14°, particularly preferably from 0.08 to 0.120, and the press density is preferably from 3.15 to 3.60 g/$cm^3$, particularly preferably from 3.20 to 3.50 g/$cm^3$. The press density in the present invention means an apparent press density after the particle powder is pressed under a pressure of 0.3 t/$cm^2$, including description in Examples, unless otherwise specified. Further, in the lithium-containing composite oxide of the present invention, the remaining alkali amount contained is preferably at most 0.03 wt %, particularly preferably at most 0.01 wt %.

In a case where a positive electrode for a lithium secondary battery is produced from such a lithium-containing composite oxide thus produced, it is formed by mixing the powder of such a composite oxide with a binder material and a carbon type electroconductive material such as acetylene black, graphite or ketjenblack. As the above binder material, polyvinylidene fluoride, polytetrafluoroethylene, polyamide, carboxymethyl cellulose or an acrylic resin may, for example, be preferably employed. The powder of the lithium-containing composite oxide of the present invention, the electroconductive material and the binder material are formed into a slurry or a kneaded product by using a solvent or a dispersion medium, which is supported on a positive electrode current collector such as an aluminum foil or a stainless steel foil by e.g. coating to form a positive electrode for a lithium secondary battery.

In a lithium secondary battery using the lithium-containing composite oxide of the present invention as the positive electrode active material, e.g. a film of a porous polyethylene or a porous polypropylene may be used as the separator. Further, as the solvent of the electrolytic solution of the battery, various solvents may be used. However, carbonate esters are preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the carbonate ester may be used alone or by mixing at least two types. Further, it may be used by mixing with another solvent. Further, according to the material of the negative electrode active material, if the chain carbonate ester is used together with the cyclic carbonate ester, there is a case where the discharge properties, the cyclic durability or the charge and discharge efficiency can be improved.

Further, in the lithium secondary battery using the lithium-containing composite oxide of the present invention as the positive electrode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The lithium salt as the solute is preferably added at a concentration of from 0.2 to 2.0 mol/L (liter) to the electrolytic solvent or the polymer electrolyte. If the concentration deviates from this range, ionic conductivity will decrease, and the electrical conductivity of the electrolyte will decrease. More preferably, it is from 0.5 to 1.5 mol/L.

In the lithium battery using the lithium-containing composite oxide of the present invention as the positive electrode active material, as the negative electrode active material, a material which can occlude and discharge lithium ions may be used. The material forming the negative electrode active material is not particularly limited, however, lithium metal, a lithium alloy, a carbon material, an oxide comprising, as a main body, a metal of Group 14 or Group 15 of the Periodic Table, a carbon compound, a silicon carbide compound, a silicone oxide compound, titanium sulfide or a boron carbide compound may, for example, be mentioned. As the carbon material, an organic material which is subjected to thermal decomposition under various thermal decomposition conditions, artificial graphite, natural graphite, soil graphite, exfoliated graphite or flake graphite etc. can be used. Further, as the oxide, a compound comprising tin oxide as a main body can be used. As the negative electrode current collector, a copper foil, a nickel foil etc. can be used. The negative electrode is produced preferably by kneading the active material with an organic solvent to form a slurry, which is coated on the metal foil current collector, dried and pressed.

The shape of the lithium battery using the lithium-containing composite oxide of the present invention as the positive electrode active material is not particularly limited. Sheet, film, folding, winding type cylinder with bottom or button shape etc. is selected according to use.

Now, the present invention will be explained in further detail with reference to Examples. However, the present invention is by no means restricted to such specific Examples.

Example 1-1

In accordance with a known method, a mixed solution of a cobalt sulfate aqueous solution with ammonium hydroxide was continuously mixed with a caustic soda aqueous solution, whereby a cobalt hydroxide slurry was continuously prepared. Then, the slurry was subjected to agglomeration, filtration and drying steps to obtain a cobalt hydroxide powder. Powder X-ray diffraction analysis of the obtained cobalt hydroxide using CuKα rays showed that the half value width of the diffraction peak of (001) plane at $2\theta=19\pm1°$ was 0.27°, and the half value width of the diffraction peak of (101) plane at $2\theta=38°\pm1$ was 0.23°. As a result of the observation by scanning electron microscope, the particles were found to be ones having fine particles agglomerated to form substantially spherical secondary particles. As a result of particle size distribution analysis on the volume basis calculated from image analysis of observation by a scanning electron microscope, the average particle size D50 was 17.5 μm, D10 was 7.1 μm and D90 was 26.4 μm. The cobalt content of the cobalt hydroxide powder was 61.5 wt %.

Separately, 1.75 g of diethylene glycol and 2.47 g of triethylene glycol were added to 5.28 g of magnesium nitrate hexahydrate, followed by stirring until complete dissolution. After complete dissolution, 33.82 g of ethanol was added, followed by stirring. To the obtained solution, 1.01 g of a mixed solution (Ti content: 9.8 wt %) of titanium acetylacetonate in xylene/1-butanol (1:1) was added, and 5.67 g of aluminum ethylacetoacetate diisopropylate was further added, followed by stirring to obtain a complex solution containing an additional element.

193.18 g of the above cobalt hydroxide powder and the above additional element solution were mixed into a slurry. The solvent was removed from the slurry by means of a rotary evaporator, and 76.56 g of a lithium carbonate powder having a specific surface area of 1.2 $m^2/g$ was mixed therewith, and the mixture was stored at room temperature for 10 days. No particular change was observed on the outer appearance after the storage. The mixture was fired in the air at 950° C. for 12 hours. The obtained composite oxide had a composition of $LiAl_{0.01}Co_{0.979}Mg_{0.01}Ti_{0.001}O_2$.

The particle size distribution of the obtained spherical lithium-containing composite oxide powder formed by agglomeration of primary particles was measured by using a laser scattering type particle size distribution measuring apparatus in a water solvent. As a result, the average particle size D50 was 15.9 μm, D10 was 6.5 μm and D90 was 23.5 μm, and the specific surface area was 0.35 $m^2/g$ as measured by BET method. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane at $2\theta=66.5\pm1°$ was 0.107°. The press density of the powder was 3.24 $g/cm^3$. 10 g of the lithium-containing composite oxide powder was dispersed in 100 g of pure water, and after filtration, the remaining alkali amount was determined by potentiometric titration with 0.1 N HCl and found to be 0.02 wt %.

The above lithium-containing composite oxide powder, acetylene black and a polyvinylidene fluoride powder were mixed in a weight ratio of 90/5/5, and N-methylpyrrolidone was added to form a slurry, which was applied on one side of an aluminum foil with a thickness of 20 μm by a doctor blade. After drying, roll pressing was carried out five times to obtain a positive electrode sheet for a lithium battery.

Using one piece of sheet which was punched out from the positive electrode sheet as a positive electrode, using a metal lithium foil having a thickness of 500 μm as a negative electrode, using a nickel foil of 20 μm as a negative electrode current collector, using a porous polypropylene having a thickness of 25 μm as a separator and using a $LiPF_6$/EC+DEC (1:1) solution (it means a mixed solution of EC and DEC in a weight ratio (1:1) of which the solute is $LiPF_6$, the same applies to solvents as mentioned hereinafter) at a concentration of 1M as an electrolytic solution, a pair of simplified sealed cell type lithium batteries made of stainless steel were assembled in an argon grove box.

A piece of the battery was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained.

Further, the density of the electrode layer was measured. Further, the charge and discharge cyclic test was sequentially carried out 30 times by use of this battery. As a result, the initial weight capacity density of the positive electrode layer at from 2.5 to 4.3 V at 25° C. was 162 mAh/g, and the capacity retention was 99.3% after 30 times of charge and discharge cycle.

Further, the other battery was charged for 10 hours at 4.3 V, and then disassembled in the argon grove box, and the positive electrode sheet was taken out after charge. After the positive electrode sheet was washed, it was punched out at a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged material was 174° C.

Example 1-2

1.75 g of diethylene glycol and 2.47 g of triethylene glycol were added to 5.28 g of magnesium nitrate hexahydrate, followed by stirring until complete dissolution, and after complete dissolution, 25.60 g of ethanol was added, followed by stirring. To this solution, 9.24 g of a mixed solution ($ZrO_2$: 13.8 wt %) of zirconium tributoxide monoacetylacetonate in xylene/1-butanol (1:1) was added, and 5.66 g of aluminum ethylacetoacetate diisopropylate was further added, followed by stirring to prepare an additional element solution.

Drying treatment was carried out in the same manner as in Example 1-1 except that the obtained complex solution containing an additional element and 191.99 g of the cobalt hydroxide powder were mixed. The obtained mixture and 76.40 g of a lithium carbonate powder having a specific surface area of 1.2 $m^2/g$ were mixed, and the mixture was stored at room temperature for 10 days. No particular change was observed on the outer appearance after storage. The mixture was fired in the air at 950° C. for 12 hours. The obtained composite oxide had a composition of $LiAl_{0.01}Co_{0.975}Mg_{0.01}Zr_{0.005}O_2$.

The particle size distribution of the obtained spherical lithium-containing composite oxide powder formed by agglomeration of primary particles was measured by using a laser scattering type particle size distribution measuring apparatus. As a result, the average particle size D50 was 16.3 μm, D10 was 6.0 μm and D90 was 23.3 μm, and the specific surface area was 0.33 $m^2/g$ as measured by BET method. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of $2\theta=66.5\pm1°$ was 0.107°. The press density of the powder was 3.21 $g/cm^3$. 10 g of the powder was dispersed in 100 g of pure water, and after filtration, the remaining alkali amount was determined by potentiometric titration with 0.1 N HCl and found to be 0.02 wt %.

Using the above lithium-containing composite oxide powder, in the same manner as in Example 1-1, a positive electrode was produced, batteries were assembled, and the characteristics were measured. The initial weight capacity density of the positive electrode layer was 161 mAh/g, and the capacity retention was 99.5% after 30 times of charge and discharge cycle. The heat generation starting temperature of the 4.3 V charged material was 175° C.

Example 1-3

In the same manner as in Example 1-1 except that a mixture of 193.18 g of the cobalt hydroxide powder and 76.56 g of the lithium carbonate powder used in Example 1-1, was mixed with a complex solution containing an additional element to which 30 g of ethanol was further added, the mixture was dried and stored at room temperature for 10 days. The outer appearance after storage changed form green-brown to liver brown. The mixture was fired in the air at 950° C. for 12 hours. The obtained composite oxide had a composition of $LiAl_{0.01}Co_{0.979}Mg_{0.01}Ti_{0.001}O_2$.

The particles size distribution of the obtained agglomerated lithium-containing composite oxide powder was measured by using a laser scattering type particle size distribution measuring apparatus. As a result, the average particle size D50 was 12.1 μm, D10 was 4.3 μm and D90 was 19.4 μm, and the specific surface area was 0.48 $m^2/g$ as measured by means of BET method. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of $2\theta=66.5\pm1°$ was 0.117°. The press density of the powder was 3.06 $g/cm^3$.

Further, 10 g of the above powder was dispersed in 100 g of pure water, and after filtration, the remaining alkali amount was determined by potentiometric titration with 0.1 N HCl and found to be 0.02 wt %. In the same manner as in Example 1-1, a positive electrode was produced, batteries were assembled, and the characteristics were measured. The initial weight capacity density of the positive electrode layer was 157 mAh/g, and the capacity retention was 98.1% after 30 times of charge and discharge cycle. The heat generation starting temperature of the 4.3 V charged material was 169° C.

Example 1-4

In the same manner as in Example 1-2 except that a mixture of 191.99 g of the cobalt hydroxide powder and 76.40 g of the lithium carbonate powder used in Example 1-1, was mixed with a complex solution containing an additional element to which 30 g of ethanol was further added, the mixture was dried and stored at room temperature for 10 days. The outer appearance after storage changed form green-brown to liver brown. The mixture was fired in the air at 950° C. for 12 hours. The obtained composite oxide had a composition of $LiAl_{0.01}Co_{0.975}Mg_{0.01}Zr_{0.005}O_2$.

The particles size distribution of the obtained agglomerated lithium-containing composite oxide powder was measured by using a laser scattering type particle size distribution measuring apparatus. As a result, the average particle size D50 was 12.5 μm, D10 was 3.6 μm and D90 was 18.5 μm, and the specific surface area was 0.51 $m^2/g$ as measured by means of BET method. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of $2\theta=66.5\pm1°$ was 0.125°. The press density of the powder was 3.00 $g/cm^3$.

Further, in the same manner as in Example 1-1, a positive electrode was produced, batteries were assembled, and the characteristics were measured. The initial weight capacity density of the positive electrode layer was 159 mAh/g, and the capacity retention was 97.9% after 30 times of charge and discharge cycle. The heat generation starting temperature of the 4.3 V charged material was 169° C.

Example 2-1

In accordance with a known method, a mixed solution of a cobalt sulfate aqueous solution with ammonium hydroxide was continuously mixed with a caustic soda aqueous solution, whereby a cobalt hydroxide slurry was continuously prepared. Then, the slurry was subjected to agglomeration, filtration and drying steps to obtain a cobalt hydroxide powder. Powder X-ray diffraction analysis of the obtained cobalt hydroxide using CuKα rays showed that the half value width of the diffraction peak of (001) plane at 2θ=19±1° was 0.27°, and the half value width of the diffraction peak of (101) plane at 2θ=38°±1 was 0.23°. As a result of the observation by scanning electron microscope, the particles were found to be ones having fine particles agglomerated to form substantially spherical secondary particles. As a result of particle size distribution analysis on the volume basis calculated from image analysis of observation by scanning electron microscope, the average particle size D50 was 17.5 µm, D10 was 7.1 µm and D90 was 26.4 µm. The cobalt content of the cobalt hydroxide was 61.5 wt %.

190.61 g of the above cobalt hydroxide powder and 76.24 g of a lithium carbonate powder having a specific surface area of 1.2 m$^2$/g were mixed.

Separately, 1.74 g of diethylene glycol and 2.46 g of triethylene glycol were added to 5.26 g of magnesium nitrate hexahydrate, followed by stirring until complete dissolution. After complete dissolution, 44.87 g of ethanol was added, followed by stirring. To the obtained solution, 10.02 g of a mixed solution (Ti content: 9.8 wt %) of titanium acetylacetonate in xylene/1-butanol (1:1) was added, and 5.65 g of aluminum ethylacetoacetate diisopropylate was further added, followed by stirring to obtain an additional element solution.

The above additive element solution was mixed with the above mixture of the cobalt hydroxide powder and the lithium carbonate powder into a slurry. In this case, the mixture ratio of cobalt hydroxide, lithium carbonate, magnesium nitrate hexahydrate, aluminum ethylacetoacetate diisopropylate and titanium acetylacetonate was adjusted to achieve $LiAl_{0.01}Co_{0.97}Mg_{0.01}Ti_{0.01}O_2$ after firing.

The solvent was removed from the slurry by means of a rotary evaporator, and the slurry was fired in the air at 950° C. for 12 hours. The fired product was crushed, and the particle size distribution of a lithium-containing composite oxide powder formed by agglomeration of primary particles was measured in a water solvent by using a laser scattering type particle size distribution measuring apparatus and as a result, the average particle size D50 was 13.0 µm, D10 was 7.0 µm and D90 was 18.0 µm, and a substantially spherical lithium-containing composite oxide powder having a specific surface area of 0.38 m$^2$/g as measured by means of BET method, was obtained. With respect to the lithium-containing composite oxide powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane at 2θ=66.5±1° was 0.110°. The press density of the powder was 3.21 g/cm$^3$. 10 g of the lithium-containing composite oxide powder was dispersed in 100 g of pure water, and after filtration, the remaining alkali amount was determined by potentiometric titration with 0.1 N HCl and found to be 0.02 wt %.

The above lithium-containing composite oxide powder, acetylene black and a polyvinylidene fluoride powder were mixed in a weight ratio of 90/5/5, and N-methylpyrrolidone was added to form a slurry, which was applied on one side of an aluminum foil with a thickness of 20 µm by a doctor blade. After drying, roll pressing was carried out five times to obtain a positive electrode sheet for a lithium battery.

Using one piece of sheet which was punched out from the positive electrode sheet as a positive electrode, using a metal lithium foil having a thickness of 500 µm as a negative electrode, using a nickel foil of 20 µm as a negative electrode current collector, using a porous polypropylene having a thickness of 25 µm as a separator and using a LiPF$_6$/EC+DEC (1:1) solution (it means a mixed solution of EC and DEC in a weight ratio (1:1) of which the solute is LiPF$_6$, the same applies to solvents as mentioned hereinafter) at a concentration of 1M as an electrolytic solution, a pair of simplified sealed cell type lithium batteries made of stainless steel were assembled in an argon grove box.

A piece of the battery was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. Further, the density of the electrode layer was measured. Further, the charge and discharge cyclic test was sequentially carried out 30 times by use of this battery. As a result, the initial weight capacity density of the positive electrode layer at from 2.5 to 4.3 V at 25° C. was 162 mAh/g, and the capacity retention was 99.2% after 30 times of charge and discharge cycle.

Further, the other battery was charged for 10 hours at 4.3 V, and then disassembled in the argon grove box, and the positive electrode sheet was taken out after charge. After the positive electrode sheet was washed, it was punched out at a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged material was 176° C.

Example 2-2

The same procedure as in Example 2-1 was carried out except that the following solution was used as the solution of an additional element in Example 2-1. Namely, 1.74 g of diethylene glycol and 2.46 g of triethylene glycol were added to 5.26 g of magnesium nitrate hexahydrate, followed by stirring until complete dissolution, and after complete dissolution, 36.45 g of ethanol was added, followed by stirring. To this solution, 18.44 g of a mixed solution (ZrO$_2$ content: 13.8 wt %) of zirconium tributoxide monoacetylacetonate in xylene/1-butanol (1:1) was added, and 5.65 g of aluminum ethylacetoacetonate diisopropylate was further added, followed by stirring to prepare a solution of an additional element.

In such a manner, a positive electrode active material having a composition of $LiAl_{0.01}Co_{0.97}Mg_{0.01}Zr_{0.01}O_2$ after firing was prepared. The fired product was crushed, and the particle size distribution of a lithium-containing oxide powder formed by agglomeration of primary particles was measured by using a laser scattering type particle size distribution measuring apparatus and as a result, the average particle size D50 was 15.9 µm, D10 was 4.1 µm and D90 was 23.8 µm, and a substantially spherical powder having a specific surface area of 0.40 m$^2$/g as measured by means of BET method, was obtained. With respect to this powder, an X-ray diffraction spectrum was obtained by using an X-ray diffraction apparatus (RINT 2100 model manufactured by Rigaku Corporation). Powder X-ray diffraction analysis using CuKα rays showed that the half value width of the diffraction peak of (110) plane in the vicinity of 2θ=66.5±1° was 0.111°. The press density of this powder was 3.19 g/cm$^3$. Further, 10 g of the above powder was dispersed in 100 g of pure water, and after filtration, the remaining alkali amount was determined by potentiometric titration with 0.1 N HCl and found to be 0.02 wt %.

Using the above lithium-containing composite oxide powder, in the same manner as in Example 2-1, a positive electrode was produced, batteries were assembled, and the characteristics were measured. The initial weight capacity density of the positive electrode layer was 160 mAh/g, and the capacity retention was 99.5% after 30 times of charge and discharge cycle. The heat generation starting temperature of the 4.3 V charged material was 175° C.

Example 2-3

Comparative Example

A lithium-containing oxide to be $LiCoO_2$ after firing was prepared in the same manner as in Example 2-1 except that no solution of an additional element was added. An agglomerated $LiCoO_2$ powder having an average particle size D50 of 14.0 µm, D10 of 11.2 µm and D90 of 17.3 µm and a specific surface area of 0.25 $m^2/g$ as obtained by means of BET method was obtained. With respect to the $LiCoO_2$ powder, an X-ray diffraction spectrum was obtained by using an X-ray diffraction apparatus (RINT 2100 model, manufactured by Rigaku Corporation). Powder X-ray diffraction analysis using $CuK\alpha$ rays showed that the half value width of the diffraction peak of (110) plane in the vicinity of $2\theta=66.5\pm1°$ was 0.108°. The obtained $LiCoO_2$ powder had a press density of 3.22 $g/cm^3$.

In the same manner as in Example 2-1, a positive electrode was produced, batteries were assembled, and the characteristics were measured. The initial weight capacity density of the positive electrode layer was 160 mAh/g, and the capacity retention was 96.9% after 30 times of charge and discharge cycle. The heat generation starting temperature of the 4.3 V charged product was 157° C.

Example 2-4

Comparative Example

A positive electrode active material having a composition of $LiAl_{0.01}Co_{0.97}Mg_{0.01}Ti_{0.01}O_2$ after firing was prepared in the same manner as in Example 2-1 except that 1.97 g of solid magnesium hydroxide (Mg content: 25.26 wt %), 1.60 g of aluminum hydroxide and 1.64 g of titanium oxide were used and mixed in a solid phase, instead of using the solution of an additional element in Example 2-1. This powder had a press density of 2.99 $g/cm^3$.

Further, in the same manner as in Example 2-1, a positive electrode was produced, batteries were assembled, and the characteristics were measured. The initial weight capacity density of the positive electrode layer was 161 mAh/g, the capacity retention was 97.8% after 30 cycles, and the heat generation starting temperature was 161° C.

Example 2-5

Comparative Example

A positive electrode active material having a composition of $LiAl_{0.01}Co_{0.97}Mg_{0.01}Ti_{0.01}O_2$ after firing was prepared in the same manner as in Example 2-2 except that 1.97 g of solid magnesium hydroxide, 1.60 g of aluminum hydroxide and 1.87 g of zirconium oxide were used and mixed in a solid phase, instead of using the solution of an additional element in Example 2-2.

This powder had a press density of 2.95 $g/cm^3$. Further, 10 g of this powder was dispersed in 100 g of pure water, and after filtration, the remaining alkali amount was determined by potentiometric titration with 0.1 N HCl and found to be 0.02 wt %.

In the same manner as in Example 2-1, a positive electrode was produced, batteries were assembled, and the characteristics were measured. The initial weight capacity density of the positive electrode layer was 161 mAh/g, the capacity retention was 97.9% after 30 cycles, and the heat generation starting temperature was 163° C.

Example 2-6

A positive electrode active material was prepared in the same manner as in Example 2-1 except that a lithium fluoride powder was further added when cobalt hydroxide and lithium carbonate were mixed in Example 2-2. With the mixture of 190.61 g of cobalt hydroxide, 75.86 g of lithium carbonate and 0.27 g of lithium fluoride, the additional element solution used in Example 2-2 was mixed into a slurry. A positive electrode active material having a composition of $LiAl_{0.01}Co_{0.97}Mg_{0.01}Zr_{0.01}O_{1.995}F_{0.005}$ after firing was prepared.

This powder had a press density of 3.19 $g/cm^3$.

Further, in the same manner as in Example 2-1, a positive electrode was produced, batteries were assembled, and the characteristics were measured. The initial weight capacity density of the positive electrode layer was 161 mAh/g, the capacity retention was 99.7% after 30 cycles, and the heat generation starting temperature was 175° C.

Example 2-7

Comparative Example

A positive electrode active material having a composition of $LiAl_{0.01}Co_{0.97}Mg_{0.01}Zr_{0.01}O_{1.995}F_{0.005}$ after firing was prepared in the same manner as in Example 2-6 except that solid magnesium hydroxide, aluminum hydroxide and zirconium oxide were used and mixed in a solid phase instead of using the solution of an additive element in Example 2-6.

This powder had a press density of 3.08 $g/cm^3$.

Further, in the same manner as in Example 2-1, a positive electrode was produced, batteries were assembled, and the characteristics were measured. The initial weight capacity density of the positive electrode layer was 160 mAh/g, the capacity retention after 30 cycles was 98.3%, and the heat generation starting temperature was 168° C.

Example 3-1

A mixed solution of a cobalt sulfate aqueous solution and ammonium hydroxide was continuously mixed with a caustic soda aqueous solution, whereby a cobalt hydroxide slurry was continuously prepared by a known method, followed by agglomeration, filtration and drying steps to obtain a cobalt hydroxide powder. Powder X-ray diffraction analysis of the obtained cobalt hydroxide using $CuK\alpha$ rays showed that the half value width of the diffraction peak of (001) plane at $2\theta=19\pm1°$ was 0.27°, and the half value width of the diffraction peak of (101) plane at $2\theta=38°\pm1$ was 0.23°. As a result of observation by scanning electron microscope, the particles were found to be ones having fine particles agglomerated to form substantially spherical secondary particles. As a result of particle size distribution analysis on the volume basis calculated from image analysis of observation by scanning electron microscope, the average particle size D50 was 13.2 μm, D10 was 9.1 μm and D90 was 17.0 μm. The cobalt content of cobalt hydroxide was 61.5%.

191.46 g of the above cobalt hydroxide powder and 76.58 g of a lithium carbonate powder having a specific surface area of 1.2 m²/g were mixed and fired in the air at 950° C. for 12 hours to prepare a lithium cobalt oxide powder.

Separately, 1.74 g of diethylene glycol and 2.46 g of triethylene glycol were added to 5.26 g of magnesium nitrate hexahydrate, followed by stirring until complete dissolution. After complete dissolution, 54.87 g of ethanol was added, followed by stirring. To the obtained solution, 10.02 g of a mixed solution (Ti content: 9.8 wt %) of titanium acetylacetonate in xylene/1-butanol (1:1) was added, and 5.65 g of aluminum ethylacetoacetate diisopropylate was further added, followed by stirring to obtain a complex solution containing an additional element.

The above complex solution containing an additional element was mixed with the above lithium cobalt oxide powder into a slurry. The mixture ratio of magnesium nitrate hexahydrate, aluminum ethylacetoacetate diisopropylate and titanium acetylacetonate was adjusted so that the composition after firing would be $LiAl_{0.01}Co_{0.97}Mg_{0.01}Ti_{0.01}O_2$.

The solvent was removed from the slurry by means of a rotary evaporator, and the slurry was fired in the air at 900° C. for 12 hours. The fired product was crushed, and the particle size distribution of the lithium-containing composite oxide powder formed by agglomeration of primary particles was measured in a water solvent by using a laser scattering type particle size distribution measuring apparatus and as a result, the average particle size D50 was 13.1 μm, D10 was 9.2 μm and D90 was 16.9 μm, and a substantially spherical lithium-containing composite oxide powder $LiAl_{0.01}Co_{0.97}Mg_{0.01}Ti_{0.01}O_2$ having a specific surface area of 0.37 m²/g as measured by means of BET method, was obtained.

With respect to the lithium-containing composite oxide powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane at $2\theta=66.5\pm1°$ was 0.112°. The press density of the powder was 3.03 g/cm³. 10 g of the lithium-containing composite oxide powder was dispersed in 100 g of pure water, and after filtration, the remaining alkali amount was determined by potentiometric titration with 0.1 N HCl and found to be 0.02 wt %.

The above lithium-containing composite oxide powder, acetylene black and a polyvinylidene fluoride powder were mixed in a weight ratio of 90/5/5, and N-methylpyrrolidone was added to form a slurry, which was applied on one side of an aluminum foil with a thickness of 20 μm by a doctor blade. After drying, roll pressing was carried out five times to obtain a positive electrode sheet for a lithium battery.

Using one piece of sheet which was punched out from the positive electrode sheet as a positive electrode, using a metal lithium foil having a thickness of 500 μm as a negative electrode, using a nickel foil of 20 μm as a negative electrode current collector, using a porous polypropylene having a thickness of 25 μm as a separator and using a $LiPF_6$/EC+DEC (1:1) solution (it means a mixed solution of EC and DEC in a weight ratio (1:1) of which the solute is $LiPF_6$, the same applies to solvents as mentioned hereinafter) at a concentration of 1M as an electrolytic solution, a pair of simplified sealed cell type lithium batteries made of stainless steel were assembled in an argon grove box.

A piece of the battery was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. Further, the density of the electrode layer was measured. Further, the charge and discharge cyclic test was sequentially carried out 30 times by use of this battery. As a result, the initial weight capacity density of the positive electrode layer at from 2.5 to 4.3 V at 25° C. was 160 mAh/g, and the capacity retention was 99.7% after 30 times of charge and discharge cycle.

Further, the other battery was charged for 10 hours at 4.3 V, and then disassembled in the argon grove box, and the positive electrode sheet was taken out after charge. After the positive electrode sheet was washed, it was punched out at a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged material was 177° C.

Example 3-2

190.61 g of the cobalt hydroxide powder in Example 3-1 and 76.24 g a lithium carbonate powder having a specific surface area of 1.2 m²/g were mixed and then fired in the air at 950° C. for 12 hours to prepare a lithium cobalt composite oxide powder.

Separately, 1.74 g of diethylene glycol and 2.46 g of triethylene glycol were added to 5.26 g of magnesium nitrate hexahydrate, followed by stirring until complete dissolution. After complete dissolution, 46.45 g of ethanol was added, followed by stirring. To this solution, 18.44 g of a mixed solution ($ZrO_2$ content: 13.8 wt %) of zirconium tributoxide acetylacetonate in xylene/1-butanol (1:1) was added, and then 5.65 g of aluminum ethylacetoacetate diisopropylate was added, followed by stirring to obtain a complex solution containing an additional element.

The same procedure as in Example 3-1 was carried out except that the above lithium-containing composite oxide powder and additional element solution were used. The resulting fired product was crushed, and the particle size distribution of the obtained lithium-containing composite oxide powder formed by agglomeration of primary particles was measured in a water solvent by using a laser scattering type particle size distribution measuring apparatus and as a result, the average particle size D50 was 13.5 μm, D10 was 9.9 μm and D90 was 17.2 μm. Further, the powder was a substantially spherical powder having a specific surface area of 0.35 m²/g as measured by means of BET method and a composition of $LiAl_{0.01}Co_{0.97}Mg_{0.01}Zr_{0.01}O_2$.

With respect to the lithium-containing composite oxide powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane at $2\theta=66.5\pm1°$ was 0.120°. The press density of the powder was 3.00 g/cm³. 10 g of the lithium-containing composite oxide powder was dispersed in 100 g of pure water, and after filtration, the remaining alkali amount was determined by potentiometric titration with 0.1 N HCl and found to be 0.02 wt %.

Using the above lithium-containing composite oxide powder, in the same manner as in Example 3-1, a positive electrode was produced, batteries were assembled, and the characteristics were measured. As a result, the initial weight capacity density of the positive electrode layer was 163 mAh/g, and the capacity retention was 99.5% after 30 charge and discharge cycles. The heat generation starting temperature of the 4.3 V charged material was 177° C.

Example 3-3

Comparative Example

The same procedure as in Example 3-1 was carried out except that a powder mixture of 1.20 g of magnesium hydroxide, 1.60 g of aluminum hydroxide and 1.65 g of titanium oxide was used instead of using the complex solution containing an additional element in Example 3-1, and that the mixture ratio was adjusted so that the composition after firing would be $LiAl_{0.01}Co_{0.97}Mg_{0.01}Ti_{0.01}O_2$. This powder was fired in the air at 950° C. for 12 hours.

The particle size distribution of the obtained powder was measured in a water solvent by using a laser scattering type particle size distribution measuring apparatus and as a result, the average particle size D50 was 13.1 μm, D10 was 9.0 μm and D90 was 16.8 μm. The specific surface area was 0.35 $m^2/g$ as measured by means of BET method. Further, powder X-ray diffraction analysis using CuKα rays showed that the half value width of the diffraction peak of (110) plane in the vicinity of 2θ=66.5±1° was 0.131°. The powder had a press density of 2.91 $g/cm^3$.

Further, in the same manner as in Example 3-1, a positive electrode was produced, batteries were assembled, and the characteristics were measured. The initial weight capacity density of the positive electrode layer was 159 mAh/g, the capacity retention was 98.2% after 30 cycles, and the heat generation starting temperature was 156° C.

Example 3-4

Comparative Example

The same procedure as in Example 3-1 was carried out except that a powder mixture of 1.60 g of magnesium hydroxide, 1.60 g of aluminum hydroxide and 2.53 g of zirconium oxide was used instead of using the complex solution containing an additional element in Example 3-2, and that the mixture ratio was adjusted so that the composition after firing would be $LiAl_{0.01}Co_{0.97}Mg_{0.01}Zr_{0.01}O_2$. This powder was fired in the air at 950° C. for 12 hours.

The particle size distribution of the obtained powder was measured in a water solvent by using a laser scattering type particle size distribution measuring apparatus and as a result, the average particle size D50 was 13.3 μm, D10 was 9.3 μm and D90 was 17.1 μm. The specific surface area was 0.33 $m^2/g$ as measured by means of BET method. Further, powder X-ray diffraction analysis using CuKα rays showed that the half value width of the diffraction peak of (110) plane in the vicinity of 2θ=66.5±1° was 0.128°. The powder had a press density of 2.88 $g/cm^3$.

Further, in the same manner as in Example 3-1, a positive electrode was produced, batteries were assembled, and the characteristics were measured. The initial weight capacity density of the positive electrode layer was 160 mAh/g, the capacity retention was 98.5% after 30 cycles, and the heat generation starting temperature was 160° C.

Example 4-1

As a cobalt source, commercial cobalt oxyhydroxide having an average particle size of 13.5 μm was used instead of the cobalt hydroxide powder. As a result of observation by scanning electron microscope, the cobalt oxyhydroxide was found to be formed by substantially spherical secondary particles formed by agglomeration of fine particles. As a result of particle size distribution analysis on the volume basis calculated from image analysis of observation by scanning electron microscope, the average particle size D50 was 13.5 μm, D10 was 6.6 μm and D90 was 18.2 μm. The cobalt content of the cobalt oxyhydroxide was 62.0 wt %.

Separately, 0.44 g of diethylene glycol and 0.62 g of triethylene glycol were added to 1.32 g of magnesium nitrate hexahydrate, followed by stirring until complete dissolution. Further, 0.41 g of acetylacetone was added to 0.65 g of niobium(V)ethoxide, followed by reflux at 70° C. for 30 minutes, and after cooling to room temperature, 0.84 g of ethanol was added, followed by stirring for 10 minutes to obtain a 10 wt % niobium solution. The glycol/ethanol solution of magnesium nitrate and the 10 wt % niobium solution were mixed and stirred, and to the resulting solution, 4.27 g aluminum ethylacetoacetate diisopropylate and 41.45 g of ethanol were added, followed by stirring to obtain a complex solution containing an additional element.

192.69 g of the above cobalt oxyhydroxide and the above additional element solution were mixed into a slurry. The solvent was removed from the mixture by means of a rotary evaporator, and the mixture was mixed with 76.08 g of lithium carbonate having a specific surface area of 1.2 $m^2/g$. The mixture was fired in an oxygen-containing atmosphere at 990° C. for 12 hours to obtain a lithium-containing composite oxide having a composition of $LiAl_{0.0075}Co_{0.989}Mg_{0.0025}Nb_{0.00102}$. An agglomerated lithium-containing composite oxide powder having an average particle size D50 of 15.5 μm, D10 of 7.3 μm and D90 of 19.6 μm and having a specific surface area of 0.30 $m^2/g$ as measured by means of BET method, was obtained. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of 2θ=66.5±1° was 0.101°. The obtained lithium-containing composite oxide powder had a press density of 3.15 $g/cm^3$. Further, the pH was 10.8, and the alkali amount was 0.02 wt % as determined by titration.

Further, in the same manner as in Example 1-1, a positive electrode was produced, batteries were assembled, and the characteristics were measured. The initial weight capacity density of the positive electrode layer was 156 mAh/g, the capacity retention after 30 cycles was 98.3%, and the heat generation starting temperature was 172° C.

Example 4-2

1.75 g of diethylene glycol and 2.47 g of triethylene glycol were added to 5.28 g of magnesium nitrate hexahydrate, followed by stirring until complete dissolution. To this solution, 5.66 g of aluminum ethylacetoacetate diisopropylate and 34.84 g of ethanol were added, followed by stirring to obtain a complex solution containing an additional element. The obtained complex solution containing an additional element and 194.54 g of a commercial $Ni_{0.8}Co_{0.2}(OH)_2$ powder having a metal content of 61.0 wt % were mixed, followed by drying treatment in the same manner as in Example 4-1. The obtained mixture and 49.68 g of lithium hydroxide having a lithium content of 28.8 wt % were mixed, followed by firing in an oxygen-containing atmosphere at 500° C. for 12 hours, and the fired product was ground in a mortar and mixed and then fired in an oxygen-containing atmosphere at 760° C. for 12 hours.

The composition of the obtained lithium-containing composite oxide was $LiNi_{0.784}Co_{0.196}Al_{0.01}Mg_{0.01}O_2$. An agglomerated lithium-containing composite oxide powder having an average particle size D50 of 13.6 μm, D10 of 5.8 μm and D90 of 17.1 μm and having a specific surface area of 0.35 m$^2$/g as measured by means of BET method, was obtained. With respect to this powder, an X-ray diffraction spectrum was obtained by using an X-ray diffraction apparatus (RINT 2100 model, manufactured by Rigaku Corporation). CuKα ray was used. Powder X-ray diffraction analysis using CuKα rays showed that the half value width of the diffraction peak of (110) plane in the vicinity of 2θ=66.5±1° was 0.131°. The obtained lithium-containing composite oxide powder had a press density of 3.00 g/cm$^3$. Further, the pH was 11.8, and the alkali amount was 3.10 wt % as determined by titration.

Further, in the same manner as in Example 1-1, a positive electrode was produced, batteries were assembled, and the characteristic were measured. The initial weight capacity density of the positive electrode layer was 188 mAh/g, the capacity retention was 98.7% after 30 cycles, and the heat generation starting temperature was 161° C.

Example 4-3

1.90 g of a mixed solution ($ZrO_2$: 13.8 wt %) of zirconium tributoxide monoacetylacetonate in xylene/1-butanol (1:1) and 48.10 g of ethanol were mixed, followed by stirring to obtain a complex solution containing an additional element. The obtained complex solution containing an additional element and 193.64 g of a $Ni_{1/3}Co_{1/3}Mn_{1/3}OOH$ powder having a metal content of 60.0 wt % were mixed, followed by drying treatment in the same manner as in Example 4-1. The obtained mixture and 82.95 g of lithium carbonate having a lithium content of 18.7 wt % were mixed and fired in an oxygen-containing atmosphere at 1,000° C. for 12 hours.

The composition of the obtained lithium-containing composite oxide was $Li_{1.05}(Ni_{1/3}Co_{1/3}Mn_{1/3})_{0.979}Zr_{0.001}O_2$. An agglomerated lithium-containing composite oxide powder having an average particle size D50 of 12.6 μm, D10 of 6.2 μm and D90 of 17.5 μm and having a specific surface area of 0.38 m$^2$/g as measured by means of BET method, was obtained. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of 2θ=66.5±1° was 0.190°. The obtained lithium-containing composite oxide powder had a press density of 3.10 g/Cm$^3$. Further, the pH was 11.0, and the alkali amount was 0.33 wt % as determined by titration.

Further, in the same manner as in Example 1-1, a positive electrode was produced, batteries were assembled, and the characteristics were measured. The initial weight capacity density of the positive electrode layer was 159 mAh/g, the capacity retention was 97.2% after 30 cycles, and the heat generation starting temperature was 197° C.

According to the present invention, a process for producing a lithium-containing composite oxide for a positive electrode for a lithium secondary battery, which has a large volume capacity density, high safety, an excellent durability for charge and discharge cycles and low temperature characteristics, with high productivity, a positive electrode for a lithium secondary battery containing the produced lithium-containing composite oxide, and a lithium secondary battery, are provided.

The entire disclosures of Japanese Patent Application No. 2004-110392 filed on Apr. 2, 2004, Japanese Patent Application No. 2004-119618 filed on Apr. 14, 2004 and Japanese Patent Application No. 2004-119620 filed on Apr. 14, 2004 including specifications, claims and summaries are incorporated herein by reference in their entireties.

What is claimed is:

1. A process for producing a lithium-containing composite oxide for a positive electrode for a lithium secondary battery, said lithium-containing composite oxide being represented by the formula $Li_pCo_xM_mO_2$ (wherein M is at least one element selected from the group consisting of Al, alkaline earth metal elements and transition metal elements other than Co, Mn and Ni, $0.9 \leq p \leq 1.2$, $0.97 \leq x \leq 1.00$, $0 \leq m \leq 0.03$, and x+m=1, which comprises using as an M element source a solution comprising a complex containing the M element dissolved in an organic solvent, wherein the solution having a complex containing the M element dissolved in an organic solvent and a Co source compound powder are mixed, the organic solvent is removed from the obtained mixture, the mixture is mixed with a lithium source compound powder, and the resulting mixture is fired at from 900 to 1,050° C. in an oxygen-containing atmosphere, and wherein the complex containing the M element a complex of diethylene glycol and triethylene glycol of a nitrate of the M element, and the organic solvent is a polar organic solvent.

2. The process according to claim 1, wherein the M element is at least one member selected from the group consisting of Ti, Zr, Hf, Nb, Ta, Mg, Cu, Sn, Zn and Al.

3. The process according to claim 1, wherein the M element is at least Al and Mg, the Al/Mg atomic ratio is from 1/5 to 5/1, and $0.002 \leq m \leq 0.025$.

4. The process according to claim 1, wherein the M element is Mg and M2 (wherein M2 is at least one element selected from the group consisting of Ti, Zr, Ta and Nb), the M2/Mg atomic ratio is from 1/40 to 2/1, and $0.002 \leq m \leq 0.025$.

5. The process according to claim 1, wherein the integral breadth of the diffraction peak of (110) plane at 2θ=66 to 67° of the lithium-containing composite oxide is from 0.08 to 0.14° as measured by means of X-ray diffraction in which CuKα is used as a radiation source, the specific surface area is from 0.2 to 0.6 m$^2$/g, and the heat generation starting temperature is at least 160° C.

6. The process according to claim 1, wherein the lithium-containing composite oxide has a press density of from 3.15 to 3.60 g/cm$^3$.

7. The process according to claim 1, wherein alkali amount remaining in the lithium-containing composite oxide is at most 0.03 wt %.

8. The process according to claim 1, wherein the Co source is cobalt hydroxide or cobalt oxyhydroxide.

9. The process according to claim 1, wherein the concentration of the complex containing the M element in the organic solvent is 3 to 15 wt %, calculated as metal.

10. The process according to claim 1, wherein the concentration of the complex containing the M element in the organic solvent is 5 to 10 wt %, calculated as metal.

11. A process for producing a lithium-containing composite oxide for a positive electrode for a lithium secondary battery, said lithium-containing composite oxide being represented by the formula $Li_pCo_xM_mO_2$ (wherein M is at least one element selected from the group consisting of Al, alkaline earth metal elements and transition metal elements other than Co, Mn and Ni, $0.9 \leq p \leq 1.2$, $0.97 \leq x \leq 1.00$, $0 \leq m \leq 0.03$, and $x+m=1$, which comprises using as an M element source a solution comprising a complex containing the M element dissolved in an organic solvent, wherein the solution having a complex containing the M element dissolved in an organic solvent, a Co source compound powder and a lithium source compound powder are mixed, the organic solvent is removed from the obtained mixture, and the mixture is fired at from 900 to 1,050° C. in an oxygen-containing atmosphere, and wherein the complex containing the M element a complex of diethylene glycol and triethylene glycol of a nitrate of the M element, and the organic solvent is a polar organic solvent.

* * * * *